(12) United States Patent
Smallegan

(10) Patent No.: US 8,616,122 B2
(45) Date of Patent: Dec. 31, 2013

(54) FOOD PREPARATION SYSTEMS AND METHODS

(75) Inventor: Jon Smallegan, Melbourne, FL (US)

(73) Assignee: Ezaspie, LLC, Melbourne, FL (US)

( * ) Notice: Subject to any disclaimer, the term of this patent is extended or adjusted under 35 U.S.C. 154(b) by 262 days.

(21) Appl. No.: 13/195,641

(22) Filed: Aug. 1, 2011

(65) Prior Publication Data
US 2013/0032040 A1 Feb. 7, 2013

(51) Int. Cl.
A22C 7/00 (2006.01)
A21D 13/08 (2006.01)

(52) U.S. Cl.
USPC .......... 99/432; 99/352; 99/537; 99/430; 99/349; 99/448; 426/556; 426/279; 426/138; 426/275; 426/280

(58) Field of Classification Search
USPC .......... 99/352, 537, 432, 430, 349, 353, 427, 99/443 C, 448, 372, 379, 380; 426/556, 426/279, 138, 275, 280, 283, 289, 296, 391, 426/446, 496, 514, 518
See application file for complete search history.

(56) References Cited

U.S. PATENT DOCUMENTS

| | | | |
|---|---|---|---|
| 820,553 A | 5/1906 | Clem | |
| 881,738 A | 3/1908 | Stillwagen | |
| 912,709 A | 2/1909 | Minneman | |
| 1,265,600 A | 6/1918 | Brewer | |
| 1,530,279 A | 3/1925 | Minneman | |
| 1,545,600 A | 7/1925 | Poole | |
| 1,800,096 A | 4/1931 | Nishimura | |
| 1,841,494 A | 1/1932 | Mears | |
| 1,841,495 A | 1/1932 | Mears | |
| 1,888,562 A * | 11/1932 | Trompeter | 426/391 |
| 1,926,548 A * | 9/1933 | Mears | 426/556 |
| 1,959,011 A | 5/1934 | Trompeter | |
| 2,041,240 A * | 5/1936 | Gluesing | 269/54.5 |
| 2,369,452 A | 2/1945 | Gamache | |
| 2,618,852 A | 11/1952 | Clough | |
| 2,866,421 A * | 12/1958 | Houldsworth | 425/318 |
| 3,026,823 A | 3/1962 | Wilcox | |

(Continued)

OTHER PUBLICATIONS http://athome.kimvallee.com/2008/11/the-art-of-making-decorative-piecrust-by-martha-stewart/.

(Continued)

Primary Examiner — Dana Ross
Assistant Examiner — Ket D Dang
(74) Attorney, Agent, or Firm — Mark R. Malek; Keith Olinga Mitchell; Zies Widerman & Malek

(57) ABSTRACT

Food preparation systems and methods for quickly and conveniently preparing filled food items. The system may comprise a pan having at least one formed pocket, perimeter track(s), one or more dividing ribs, and dividing track(s). A dough cutting tool may be inserted into and guided along the perimeter track(s) and dividing track(s) to slice excess dough away from the filled food item. The present invention may further comprise a roller tool that simultaneously cuts through the dough as well as flutes or crimps the dough along both sides of the cutting edge. One or more tactile indicators may also be provided on the underside of the pan to allow a user to easily locate the perimeter track(s) and dividing track(s) when the pan is covered with dough. Filled food items may then either be baked within the inventive pan or moved to a conventional baking pan or sheet.

4 Claims, 16 Drawing Sheets

(56) References Cited

U.S. PATENT DOCUMENTS

| | | | |
|---|---|---|---|
| 3,060,838 A * | 10/1962 | Priore | 99/430 |
| 3,099,377 A * | 7/1963 | Metzler et al. | 229/406 |
| 3,899,962 A * | 8/1975 | Federico | 99/447 |
| 5,215,775 A * | 6/1993 | Hoffman, Jr. | 426/418 |
| 5,622,742 A | 4/1997 | Carollo | |
| 5,789,009 A * | 8/1998 | Kordic et al. | 426/391 |
| 6,083,545 A | 7/2000 | Nelson et al. | |
| 7,610,837 B2 | 11/2009 | Craig et al. | |
| 7,823,489 B1 | 11/2010 | Craig et al. | |
| 2006/0180031 A1 * | 8/2006 | Carlson et al. | 99/352 |

OTHER PUBLICATIONS http://www.kitchencontraptions.com/archives/035023.php.
http://www.kitchenware.co.uk/browse__16529.
http://www.recipetips.com/glossary-term/t--36285/pastry-crimper. asp.
http://www.amazon.com/Imperia-Ravioli-Maker-Time-Italy/dp/ B00127SFC0/ref=sr_1__5?ie=UTF8&qid=1311002668&sr=8-5.
http://www.bigkitchen.com/event/catalog:detail/CatalogCode/ diablo-stovetop-warm-pressed-sandwich-maker-458578.
http://www.cuisinart.com/products/grilis/wm-sw2.html.

* cited by examiner

FOOD PREPARATION SYSTEMS AND METHODS

CROSS REFERENCE TO RELATED APPLICATIONS

Not applicable.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISK

Not applicable.

BACKGROUND OF THE INVENTION

1. Field of the Invention

The present invention generally relates to food preparation systems and methods and, more particularly, to systems and methods for quickly and conveniently preparing filled or stuffed food items such as pies, pastries, desserts, pocket sandwiches, stuffed pizzas, calzones, and the like by an unskilled culinary user.

2. Background Art

Largely due to their ease and convenience, filled food items have always enjoyed great popularity. Filled food items may include a wide range of food products including but not limited to pies, tarts, Danishes, and other desserts as well as pocket sandwiches, stuffed pizzas, calzones, empanadas, and the like. These edible stuffed items may be made at home or commercially available typically in the form of a baked dough shell enclosing some food ingredients (i.e., the "filling(s)"). The filling(s) may be of various compositions, depending upon the desired product as noted above. For example, in the case of stuffed pizzas the filling(s) typically may comprise one or more of the following: tomato sauce, cheese, spices, vegetables (e.g., onions, green peppers, mushrooms, etc.), meats (e.g., pepperoni, ground beef, ham, bacon, etc.), and the like.

In order to make the filled food items, such as stuffed pizza or a stuffed sandwich, an uncooked hollow dough "shell" or "pocket" is formed to hold the desired filling(s). The particular filling(s) is(are) introduced into the pocket and the pocket is then sealed along a seam line or joint to hold the filling(s) inside. The uncooked stuffed pizza/sandwich pocket is then baked in an oven to cook it. If the hollow dough pocket is prepared and sealed properly the resulting stuffed pizza or sandwich should be relatively leak-proof, i.e., the filling will not leak out the seam(s), even if the filling is itself of a leaky consistency. The hollow pockets used to form stuffed pizzas and/or stuffed sandwiches have been of various shapes. One particularly, common shape is a small pie-like or tart-like shape. Another common shape is a rectangle, with somewhat rounded corners. The shell or pocket can be pre-made or made to order at the time that the pizza, sandwich, or other filled food item is made.

The formation of filled food items as described above has generally been a hit or miss proposition, depending upon the skill of the maker, the amount of preparation time devoted to the formation of the edible product, and the type of equipment utilized. Thus, some businesses have been quite successful in producing goods such as stuffed pizzas and/or stuffed sandwiches in quantity, and with repeatable high quality results. Other businesses have not achieved such repeatable, economical results.

Filled food items such as toasted sandwiches are also quite popular in this country today, especially in fast food restaurants. Such sandwiches are typically grilled between opposing faces or dies of a grill. A number of different grill constructions are available. These prior art devices however have some drawbacks. Such device may have a pair of dies hinged together for encompassing and holding the portions of a sandwich together during the heating process. Such sandwich grills may have one plate or die mounted on a base member with operating mechanism for pivoting one of the plates toward and away from the other plate. The device may include electrical heating elements in the sandwich dies or mold plates. While these are both satisfactory in many respects, these are not suitable for high speed production and are not necessarily cost-efficient for use at home outside a high-output commercial environment.

Other deficiencies of prior art devices include problems wherein excess sandwich material is placed between the dies. For example, it is common to use bread or a dough shell which exceeds the size of the dies themselves. In such case, the excess bread must be severed from that contained in the die and preferably permitted to fall within a scrap container or the like positioned below the die. Also, in the case of filling layers of relatively large volume it is frequently the case that some of the filling layer is pressed out at the edge of the filled food items as they are being pressed together. Thus, a filling layer that bulges out of the side of the stuffed sandwich or other filled food item may be problematic and the pressing-together process may provide a pie, pocket, or sandwich that opens again relatively easily.

Thus, there is a need for systems and methods of use to enable the rapid and easy formation of consistent, high quality, evenly cooked, leak-proof, filled food items. Accordingly, it is desirable that such systems and methods provide for quick and efficient removal of excess sandwich material, as well as provide simple and convenient creation of filled food items without requiring a large amount of time or culinary skill on the part of a user of the systems and methods.

BRIEF SUMMARY OF THE INVENTION

The present invention comprises systems and methods that have one or more of the following features and/or steps, which alone or in any combination may comprise patentable subject matter.

In accordance with one embodiment of the present invention, a food preparation system comprising a pan, the pan comprising at least one formed pocket, a rim disposed about the circumference of the at least one formed pocket, and at least one perimeter track disposed on at least a portion of said rim. Additionally, the at least one perimeter track is configured to receive a dough cutting tool and guide the dough cutting tool within the at least one perimeter track. The at least one perimeter track may comprises a groove formed into the surface of the rim or a channel defined by two parallel rows of a plurality of flutes formed on the surface of the rim.

In accordance with another embodiment of the present invention, the pan may comprise two or more pockets and one or more dividing ribs, wherein one of the one or more dividing ribs is disposed between each of the adjacent two or more pockets, and at least one dividing track disposed on each of the one or more dividing ribs. Additionally, the at least one perimeter track and the at least one dividing track are configured to receive a dough cutting tool therein and guide the dough cutting tool within the at least one perimeter track and the at least one dividing track, respectively. Both the at least one perimeter track and said at least one dividing track may either comprise a groove formed into the surface of the rim and the one or more dividing ribs or a channel defined by two parallel rows of a plurality of flutes formed on the surface of the rim and the one or more dividing ribs.

The systems and methods of the present invention may further utilize a roller tool comprising a cutting disk having a cutting edge about the circumference of the cutting disk and a plurality of flutes disposed about the circumference of the cutting disk, wherein the plurality of flutes are disposed adjacent to and on both sides of the cutting edge, wherein the radius of the cutting disk at the cutting edge is greater than the radius of the cutting disk at the plurality of flutes. Additionally, the cutting edge may comprise a radial edge and the at least one perimeter track and/or the one or more dividing ribs are configured to receive the cutting edge of the cutting disk and guide the cutting edge of the cutting disk within the at least one perimeter track and/or the one or more dividing ribs, respectively.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating the preferred embodiments of the invention and are not to be construed as limiting the invention. In the drawings.

DETAILED DESCRIPTION OF THE INVENTION

Figure 1:
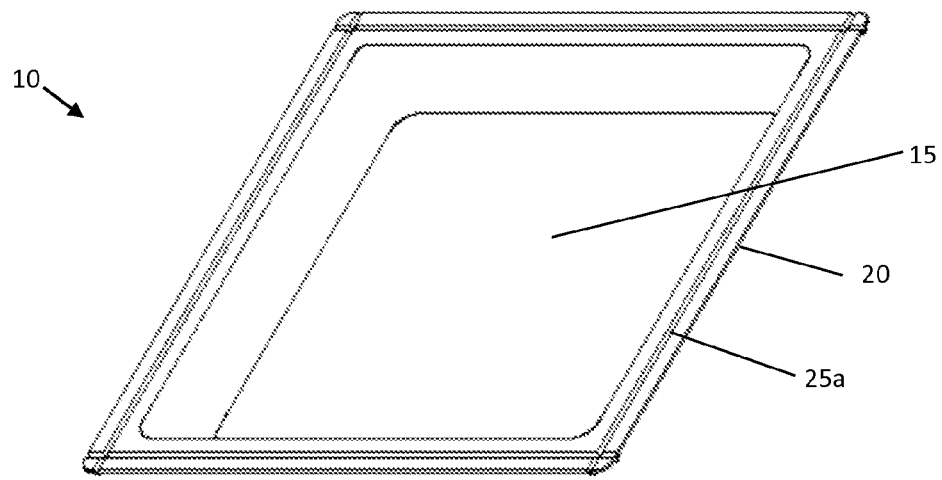
FIGS. 1-4 depict perspective views of single pocketed pan embodiments of a food preparation system of the present invention.

Although a detailed description as provided in the attachments contains many specifics for the purposes of illustration, anyone of ordinary skill in the art will appreciate that many variations and alterations to the following details are within the scope of the invention. Accordingly, the following preferred embodiments of the invention are set forth without any loss of generality to, and without imposing limitations upon, the claimed invention. Thus the scope of the invention should be determined by the appended claims and their legal equivalents, and not merely by the preferred examples or embodiments given.

The systems and methods of the present invention comprise the use of a specialized pan for the preparation of filled food items such as pies, pastries, desserts, pocket sandwiches, stuffed pizzas, calzones, and the like. Preferred embodiments of the present invention may further incorporate a roller tool configured to be used with the specialized pan. Use of the pan alone, or in combination with the roller tool, may facilitate the making and/or preparation of food items from various dough products. While there have been prior versions of rollers with flutes and cutting disks, all are based on going around and cutting only the outside edge of the pan while fluting the crust. The systems and methods of the present invention provide a track on the upper surface of a pan to receive and guide either a conventional dough cutting tool or a roller tool, wherein the roller tool of the present invention combines the process of cutting and fluting two dough edges into one easily accomplished process or method around both the crust edge and any inner dividing ribs of the pan.

One of the most difficult skills to learn as a cook is how to make dough and roll it out to prepare it for baking items such as pie, pizza, tarts, pasties and other treats. Some of the difficulty of handling dough has been simplified by the availability of pre-made pie crust, pizza dough, dinner roll dough, and the like. In some versions the dough may already be rolled out and ready to be used. The systems and methods of the present invention make using dough that may be either homemade or pre-made fast and easy and greatly improves the speed and convenience of making one or more filled food items.

A specialized pan of the present invention allows either a pre-made rolled out dough or homemade dough to be placed over the pan generally covering the entire surface of the pan. The pan may have any number of pockets, such as ranging from 1 to 12 or more pockets, depending on the size and shape of the rolled dough and the intended type of filled food item(s) to be made. In preferred embodiments, the at least one formed pocket may be about 5/8" deep and the dough may be gently patted down into the at least one pocket. The pans may be formed in any shape such as but not limited to circular, square, triangular and half round shapes with differing patterns of pockets and differing depths of pockets that may be varied to suit the likely use of the pan.

The pockets in the pan that now have dough in them may then be filled with any different combination of fillings depending on whether a snack, appetizer, dessert or main course is required. Exemplary combinations may include but are not limited to pepperoni, onion, cheese, and sausage to create pizza type snacks; fruit preparations such as apple, cherry or peach to prepare individual pie like desserts; or combinations of meat, potato, veggies, and the like may be used to make individual pot pie main entrees.

Figure 2:
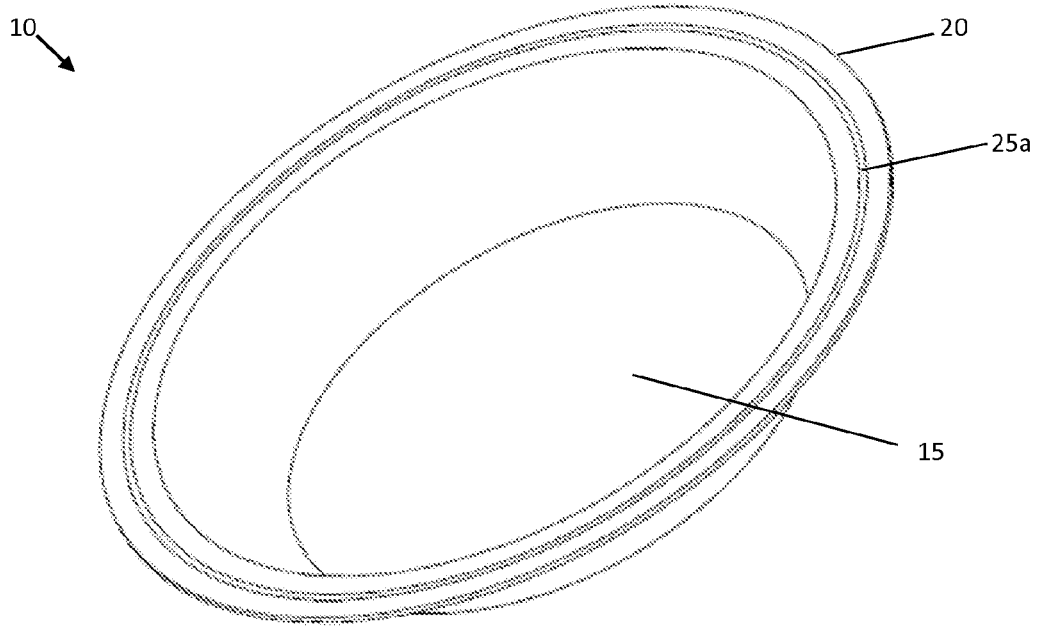
Figure 3:
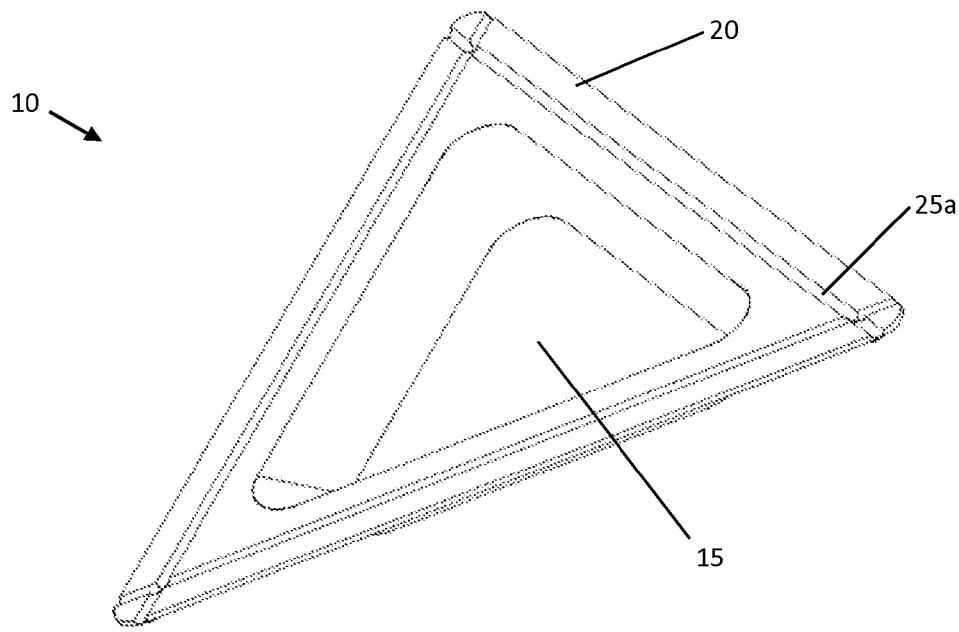
Figure 4:
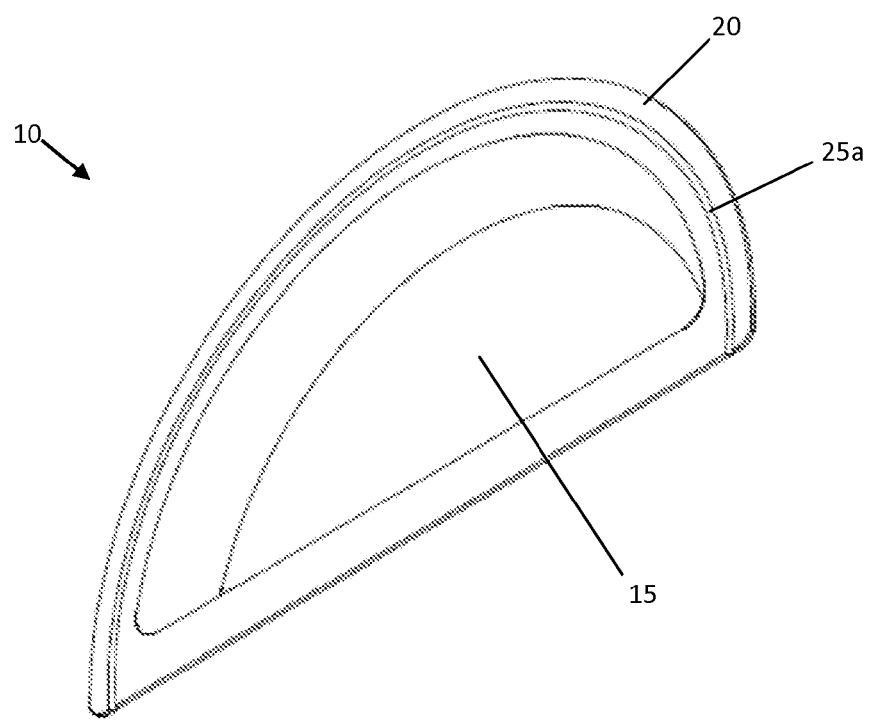
Figure 5:
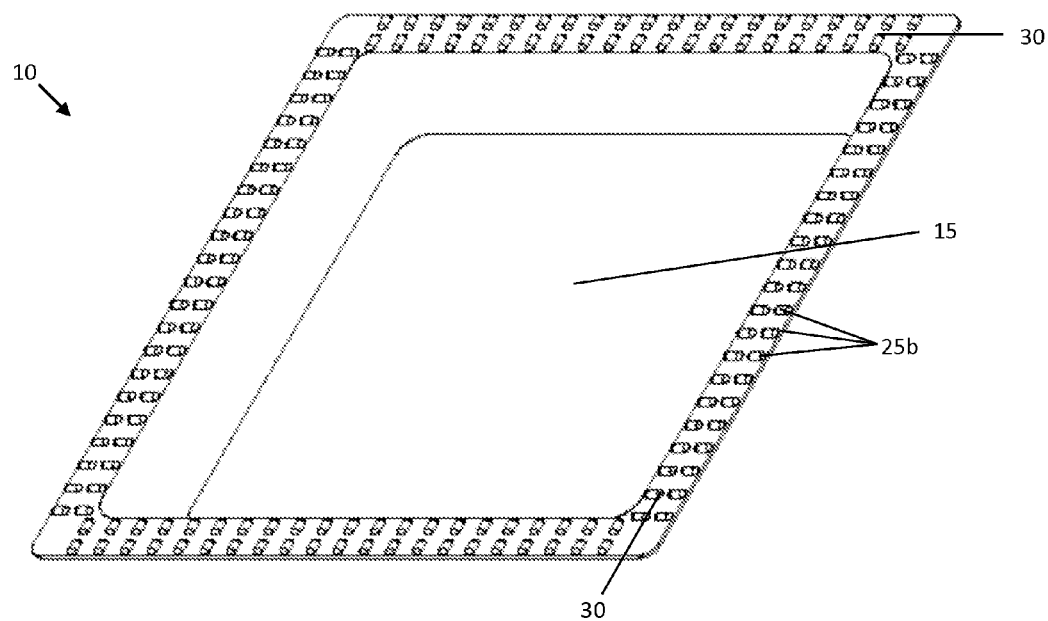
FIGS. 5-8 depict perspective views of other single pocketed pan embodiments of a food preparation system of the present invention.
Figure 6:
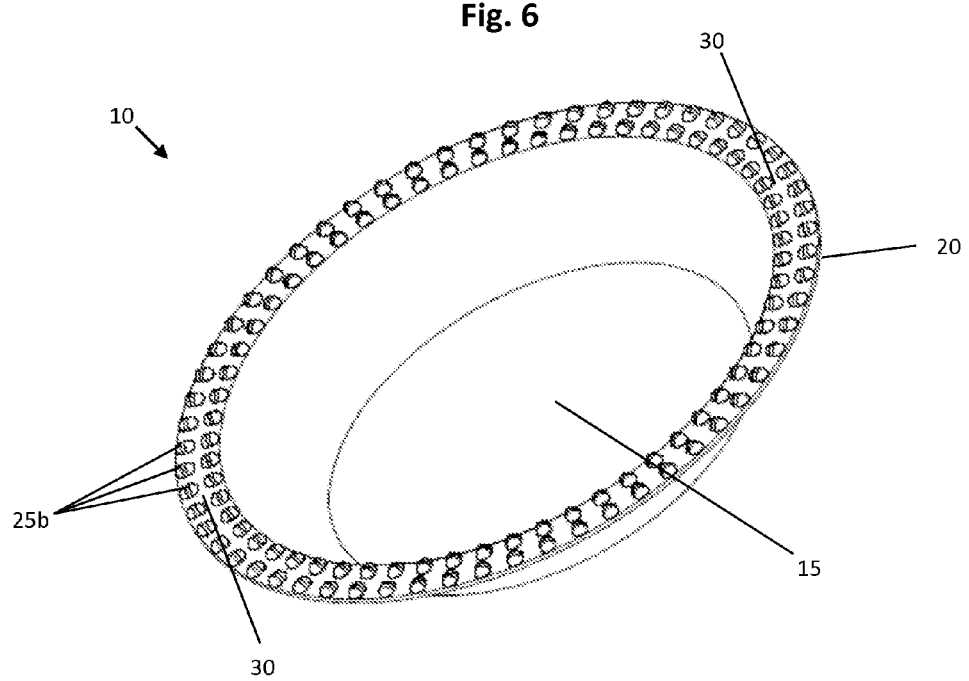
Figure 7:
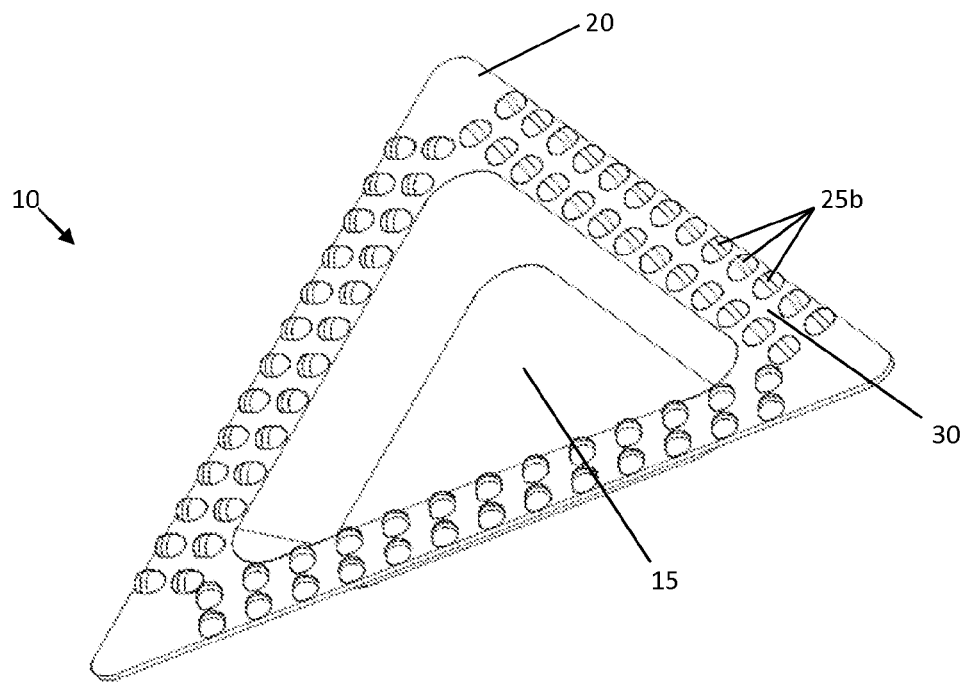
Figure 8:
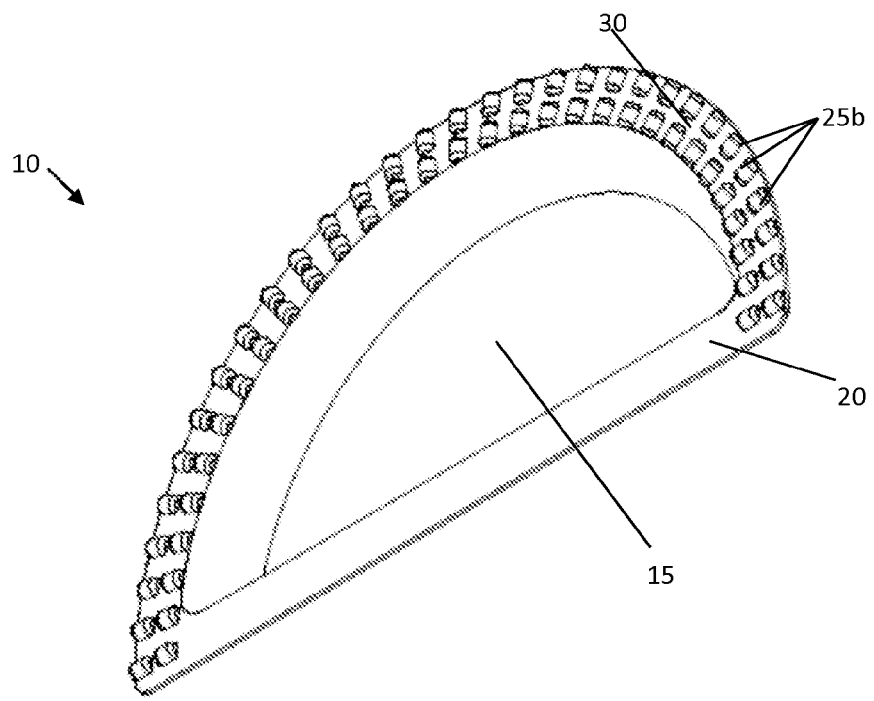
Figure 9:
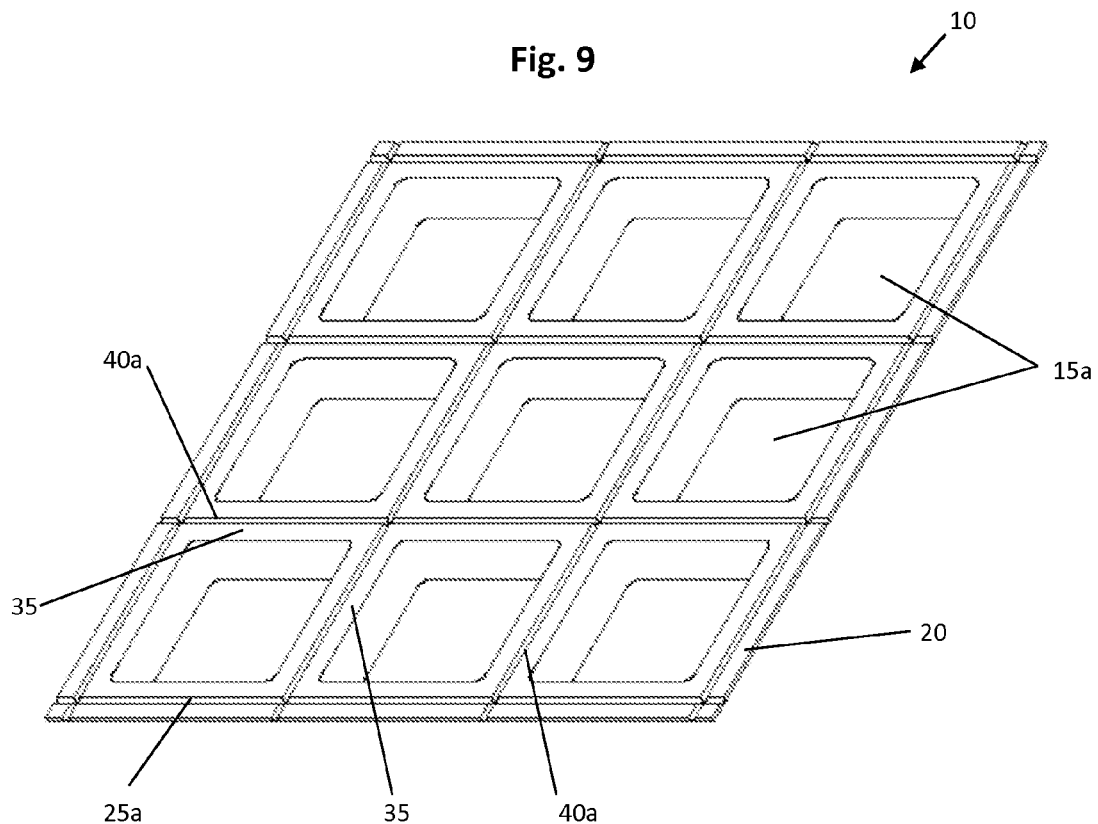
FIGS. 9-12 depict perspective views of two or more pocketed pan embodiments of a food preparation system of the present invention.

Referring now to the Figures, and particularly, to FIGS. 1-8, a first embodiment of pans 10 of a system of the present invention may be seen. A base form of the invention may comprise a pan 10 having at least one formed pocket 15 and a rim 20 about the at least one formed pocket 15. At least one perimeter track 25 may be incorporated in an upper surface of the rim 20 about the outer circumference of the pan 10. As shown in FIGS. 1-8, the pan 10 may comprise any shape configuration known within the art. Examples include but may not be limited to FIGS. 1 and 5 depicting a square pan 10, FIGS. 2 and 6 depicting a circular pan 10, FIGS. 3 and 7 depicting a triangular pan 10, and FIGS. 4 and 8 depicting a semi-circular pan 10.

In use, a first layer of dough may be placed over any shape embodiment of a pan 10 and the first layer of dough may conform or be pressed to conform to the shape of the at least one formed pocket 15 within the pan 10. Any desired filling such as for desserts, stuffed sandwiches, and the like may be placed atop the first layer of dough within the at least one formed pocket 15. Finally, a second layer of dough may be placed atop both the filling and the first layer of dough. The at least one perimeter track 25 disposed on the upper surface of the rim 20 of the pan 20 may be configured to receive and guide a conventional dough cutting tool such as a knife, a simple cutting disk such as a pizza cutter, or almost any structure having a narrow edge to trim both the first and second layers of dough around the circumference of the filled food item.

As shown in FIGS. 1-4, a first embodiment of the at least one perimeter track 25 of the present invention may comprise a groove 25a formed in the upper surface of the rim 20 of the pan 10. The groove 25a may be configured to receive and guide a conventional dough cutting tool. As shown in the FIGS. 1-4 and 9-12, any configuration or shaped pan 10 may incorporate a groove 25a as taught by the present invention. Such a groove 25a may be incorporated into any shaped pan 10 that may include but is not limited to having any combination of straight and/or curved edges. As shown in exemplary FIGS. 1 and 3-4, the groove 25a in both straight edges and semi-circular edges may run off the rim 20 of the pan 10 to provide for easier starting and ending points when cutting dough that is laid thereon. In another preferred embodiment, as shown in FIG. 2, a groove 25a in a circular pan 10 may comprise a closed loop having no need or benefit from having the groove 25a run off the edge of the rim 20 as compared to FIGS. 1 and 3-4.

As shown in FIGS. 5-8, a second embodiment of the at least one perimeter track 25 of the present invention may comprise a plurality of flutes 25b defining or forming a channel 30 on the upper surface of the rim 20 of the pan 10 as the plurality of flutes 25b are arranged or disposed in a configuration having two parallel rows of flutes as shown. Each flute of the plurality of flutes 25b may comprise any shape configuration known within the art including but not limited to half spheres, cylinders, ellipses, ovals, cones, frustums, pyramids, prisms, other polygons, and the like. FIGS. 5-8 depict the channel 30 being defined and formed between two parallel rows of the plurality of flutes 25b on the upper surface of the rim 20. The edges of the plurality of flutes 25b defining the channel 30 may be rounded, beveled, angled, sloped, or otherwise shaped to help guide a conventional dough cutting tool into and along the channel 30 during use of the pan 10 of the present invention.

In other preferred embodiments, and as shown in FIGS. 9-16, the present inventive pans 10 may be formed in any shape or configuration, as disclosed above, and may further comprise two or more pockets 15a. The two or more pockets 15a may be formed by one or more dividing ribs 35 that are elevated relative to the bottom of each of the two or more pockets 15a and thereby provide a side wall for each of the adjacent two or more pockets 15a. Each of the one or more dividing ribs 35 may comprise an upper surface further comprising at least one dividing track 40. The at least one dividing track 40 is similar in structure and function to the at least one perimeter track 25 disclosed above with the embodiments comprising at least one formed pocket 15 as shown in FIGS. 1-8. The one or more dividing ribs 35 separating the two or more pockets 15a may comprise at least one dividing track 40 to allow multiple pocket food items such as pies, tarts, calzones, and the like to be quickly and easily formed from a single pan 10 of the present invention. In such embodiments, as shown in FIGS. 9-16, both the at least one perimeter track 25 and the one or more dividing ribs 35 may be configured to receive and guide a conventional dough cutting tool such as a knife, a simple cutting disk, or almost any structure having a narrow edge to cut both the first and second layers of dough around the rim 20 of the pan 10 and filled food item and to cut the dough along the one or more dividing ribs 35 between the two or more pockets 15a of the pan 10, respectively.

Figure 10:
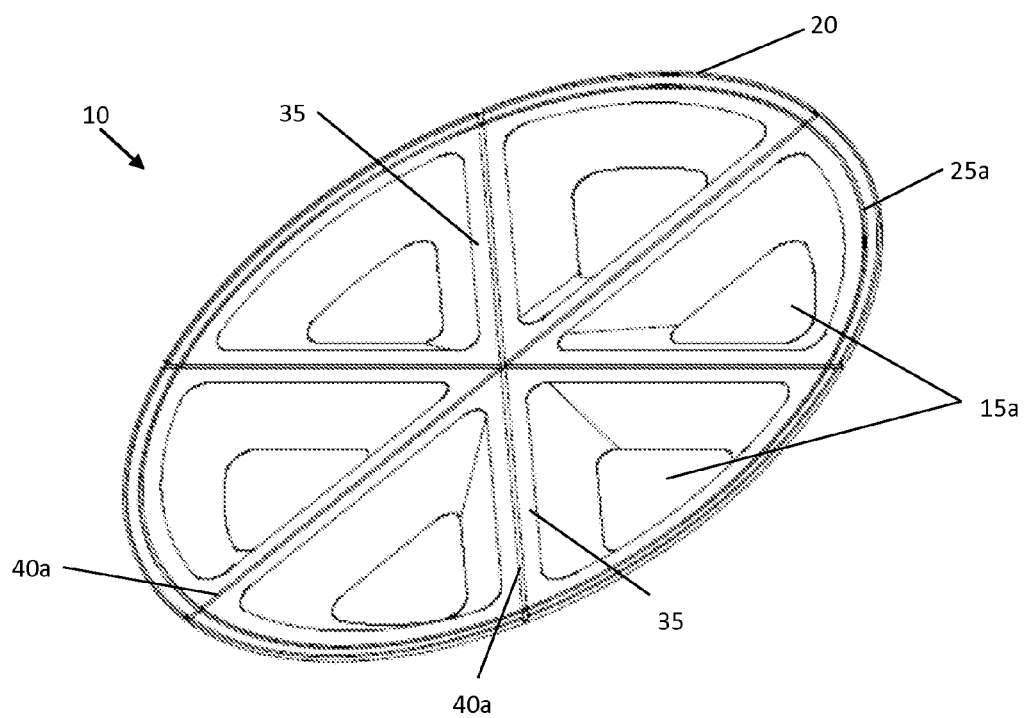
Figure 11:
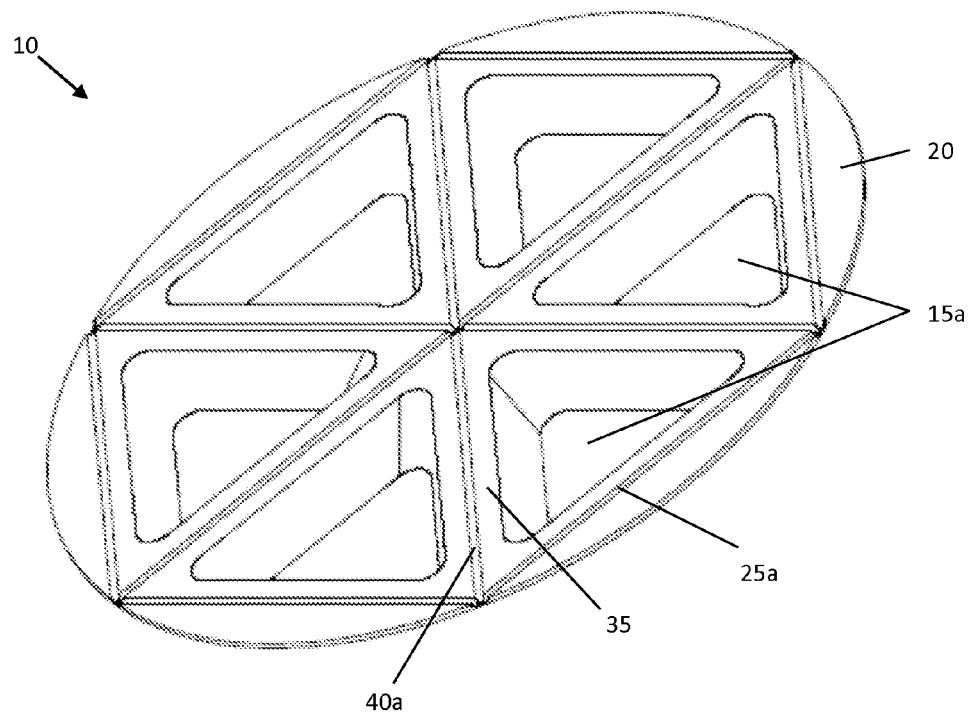
Figure 12:
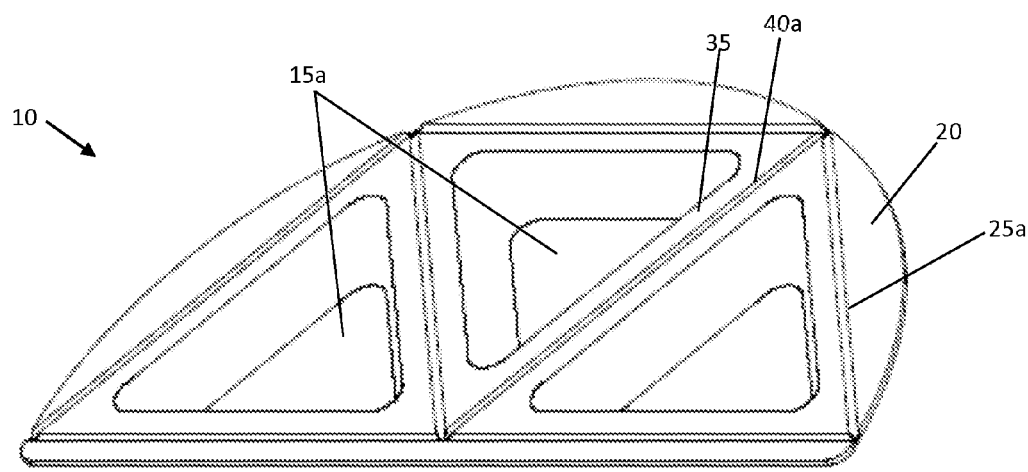
Figure 13:
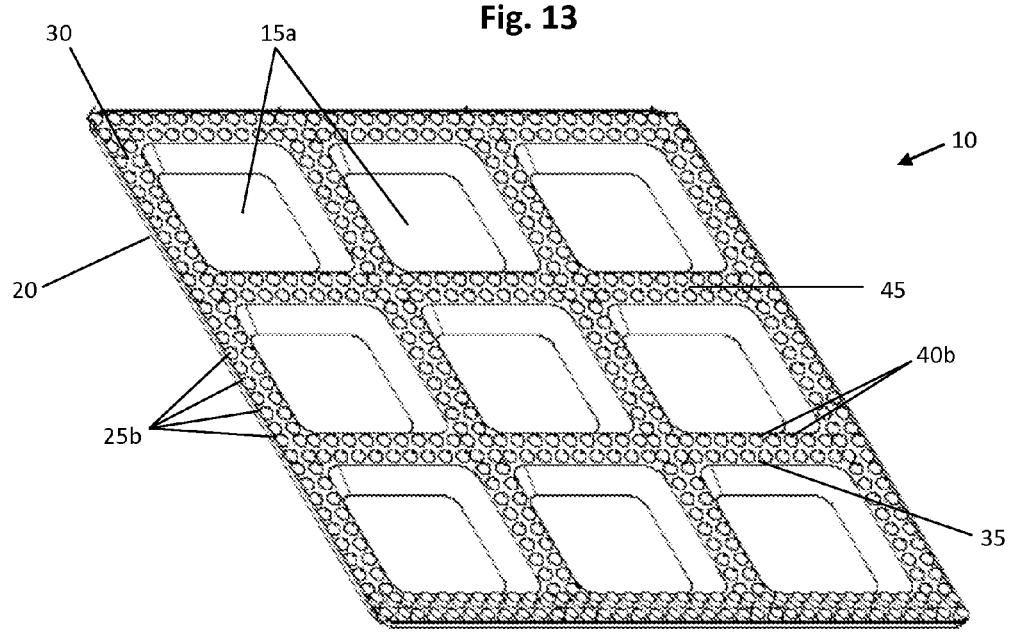
FIGS. 13-16 depict perspective views of other two or more pocketed pan embodiments of a food preparation system of the present invention.
Figure 14:
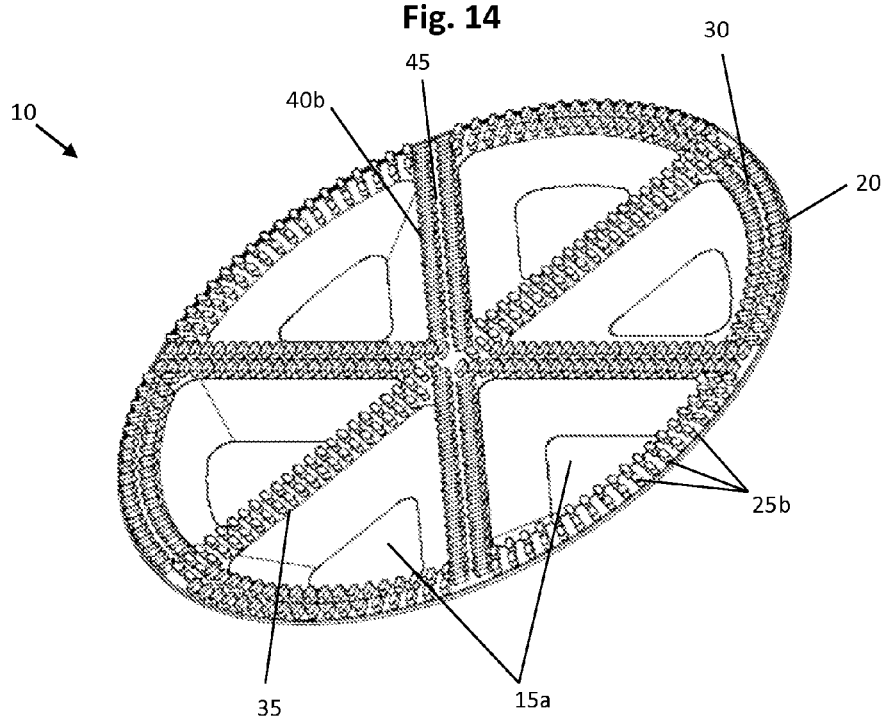
Figure 15:
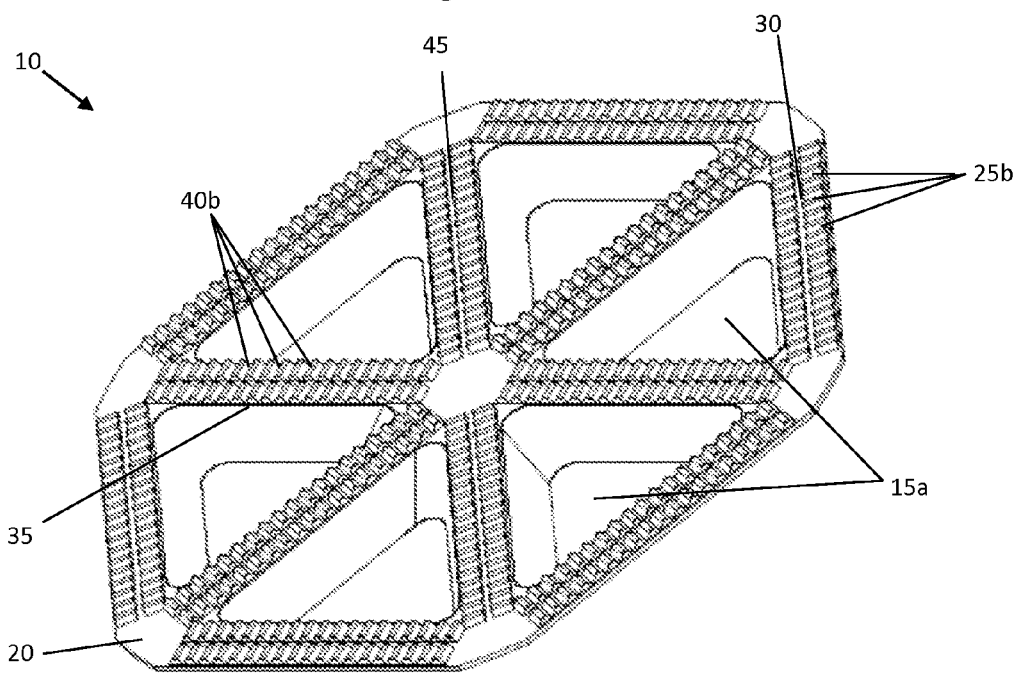
Figure 16:
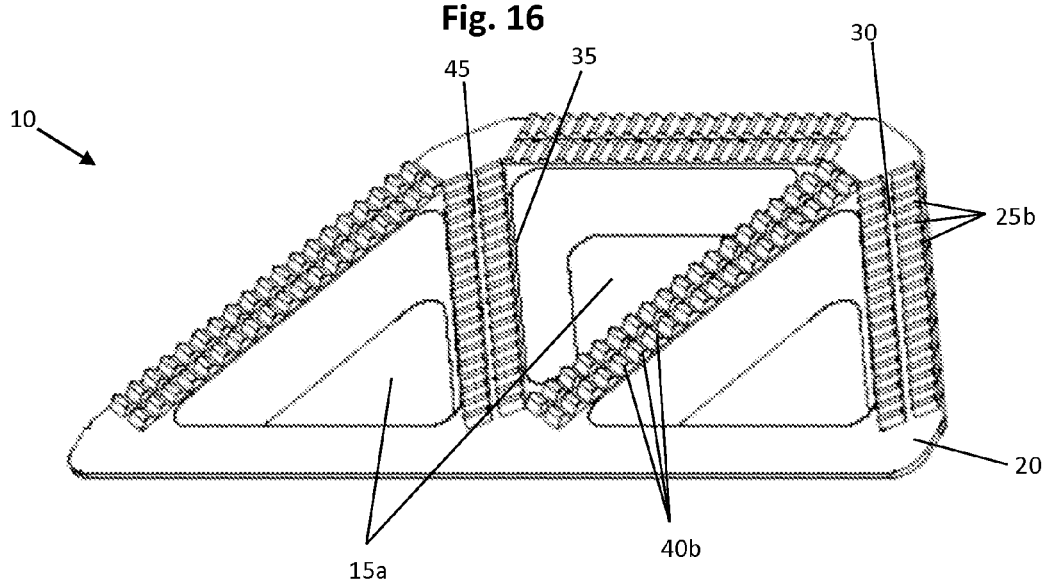

As shown in FIGS. 9-12, a first embodiment of pans 10 of the present invention having two or more pockets 15a may have at least one perimeter track 25 and/or at least one dividing track 40 that may each independently comprise a groove 25a/40a formed into the upper surface of the rim 20 and/or top surface of the one or more dividing ribs 35 of the pan 10, respectively. The groove 25a/40a is configured to receive and guide a conventional dough cutting tool through the at least one perimeter track 25 and/or at least one dividing track 40. As shown in the Figures, any configuration or shaped pan 10 may incorporate a groove 25a/40a as taught by the present invention. Such a groove 25a/40a may be incorporated into any shaped pan 10 that may include but is not limited to having any combination of straight and/or curved edges. As shown in exemplary FIGS. 9-12, the groove 25a/40a in straight or semi-circular edges may run off the rim 20 of the pan 10 to provide for easier starting and ending points when cutting the dough that is laid thereon. In another preferred embodiment, as shown in FIG. 10, a groove 25a in a circular pan 10 may comprise a closed loop and have no need or benefit from having the groove 25a run off the edge of the rim 20 as compared to FIGS. 9 and 11-12.

As shown in FIGS. 13-16, a second embodiment of pans 10 of the present invention having two or more pockets 15a may have at least one perimeter track 25 and/or at least one dividing track 40 that may each independently comprise a plurality of flutes 25b/40b defining or forming a channel 30/45 on the upper surface of the rim 20 and/or on the upper surface of one or more dividing ribs 35 of the pan 10 as the plurality of flutes 25b/40b are arranged or disposed in a configuration having two parallel rows of flutes as shown in the Figures. Each individual flute of the plurality of flutes 25b/40b may comprise any shape configuration known within the art including but not limited to half spheres, cylinders, ellipses, ovals, cones, frustums, pyramids, prisms, other polygons, and the like. FIGS. 13-16 depict the channels 30/45 each being defined and formed between two parallel rows of a plurality of flutes 25b/40b on both the upper surface of the rim 20 and one or more dividing ribs 35. The edges of the plurality of flutes 25b/40b defining the channels 30/45 may be rounded, beveled, angled, sloped, or otherwise shaped to help guide a conventional dough cutting tool into and along the channel 30/45 during use of the pan 10 of the present invention.

The major advantage of this system, as described to this point, is to quickly and easily allow the dough around the rim 20 of pans 10 having at least one pocket 15 and/or the dough around the rim 20 and along the one or more dividing ribs 35 of pans 10 having two or more pockets 15a to be cut allowing for efficient preparation of filled food items even by unskilled users. Both embodiment styles, having either the at least one formed pocket 15 or two or more pockets 15a, may comprise pans 10 having pockets of different depths as needed for the filled food item(s) to be made. The scope of the present invention readily includes design choices that may include but are not limited to shape, number of pockets, depth of pockets, materials used, and the like. Choice of materials may affect efficiency and/or functionality to a certain degree. As an example, any pan 10 of the present invention may comprise metal (such as aluminum, stainless steel, and any other metals used in food preparation items), plastic, and the like. In preferred embodiments, where the filled food item(s) will be cut and baked while still in the pan 10, such pans 10 may be constructed from metal. In preferred embodiments where the filled food item(s) will be cut in the pan 10 and then moved to a baking sheet, such pans 10 may be constructed from plastic. Similarly, when the filled food item(s) are to be both cut and baked in the pan 10, the at least one perimeter track 25 and/or at least one dividing track 40 may comprises grooves 25a/40a, respectively, to allow for easy cleaning of the pan 10. When the filled food item(s) are to be cut in the pan and baked on a baking sheet, the at least one perimeter track 25 and/or at least one dividing track 40 may independently comprise grooves 25a/40a or a plurality of flutes 25b/40b, respectively. When the at least one perimeter track 25 and/or at least one dividing track 40 comprise a plurality of flutes 25b/40b and the filled food item(s) are both cut and baked in the pan 10, the dough may become "baked in" or burnt within or between the individual flutes causing problems for generally removing the stuffed food items from the pan 10 after baking, interfering with use of a spatula along the rim 20 of the pan 10, and preventing effective cleaning of the pan 10. While these are practical preferences for preferred embodiments, any combination of these features of a pan 10 (both preferred and non-preferred features depending on use) of the present invention are still deemed to be within the scope of the present invention.

Figure 17:
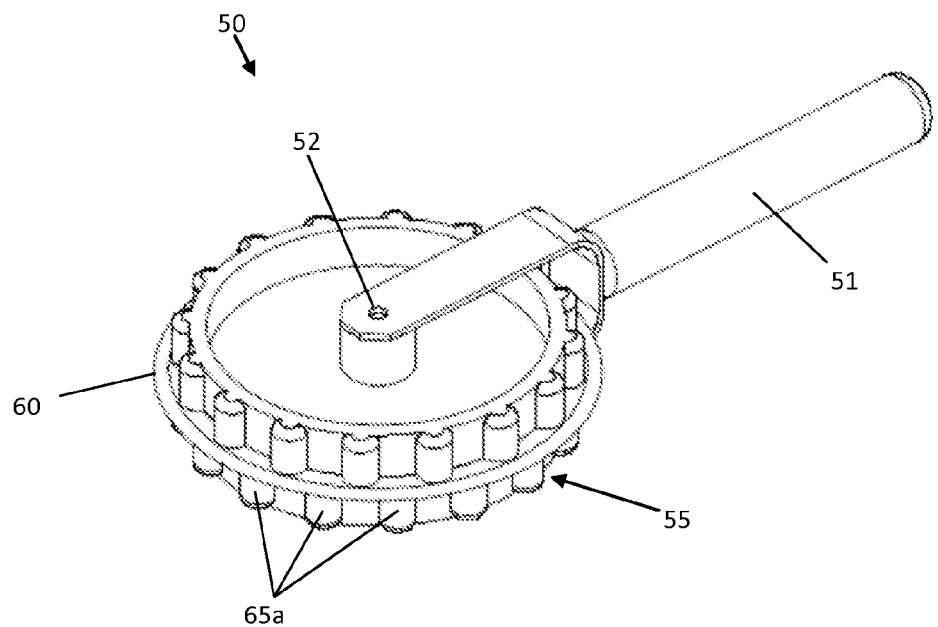
FIG. 17 depicts a perspective view of an embodiment of a roller tool of a food preparation system of the present invention.
Figure 18:
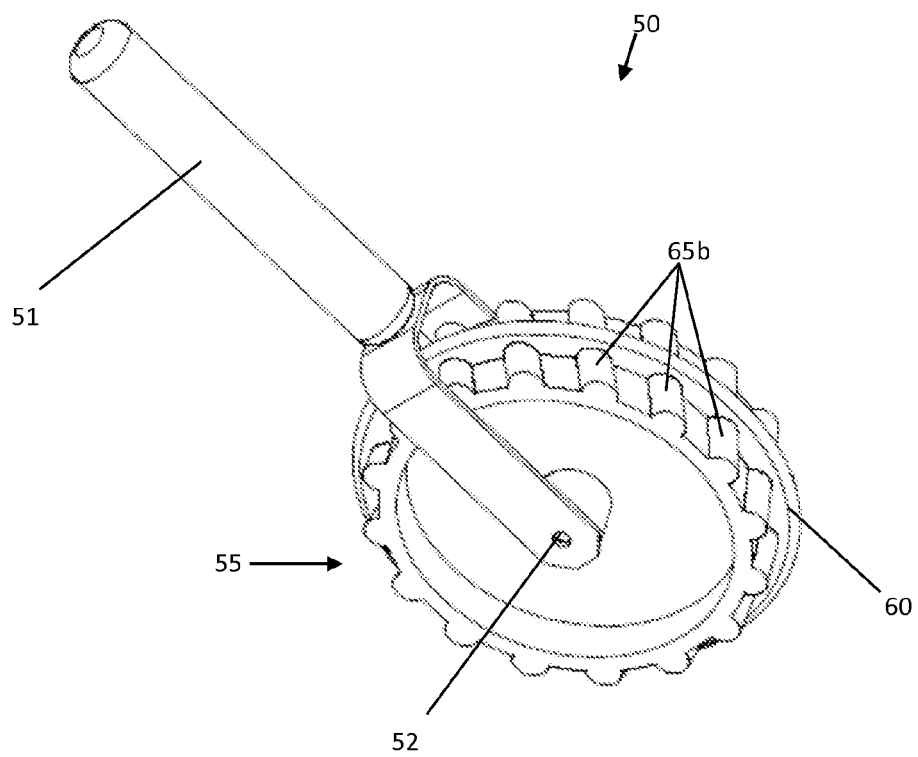
FIG. 18 depicts a perspective view of another embodiment of a roller tool of a food preparation system of the present invention.

Another embodiment of the systems and methods of the present invention may further comprise the use of a complimentary roller tool along with an already disclosed specialized pan of the present invention. The specialized roller tool may replace the conventional dough cutting tool as disclosed above providing additional features and benefits not available within the prior art. FIGS. 17-18 depict exemplary embodiments of a roller tool 50 of the present invention. The roller tool 50 may generally comprise a handle 51, an axle 52, and a cutting disk 55. In use, the cutting disk 55 may be rotatable about the axle 52 with the axle 52 being in communication with the handle 51. While the general shape and configuration of one embodiment of the roller tool 50 may be somewhat similar to a conventional pizza cutter, several structures and features on the cutting disk 55 provide for improvements in function and efficiency beyond that which is disclosed in the prior art.

Figure 19:
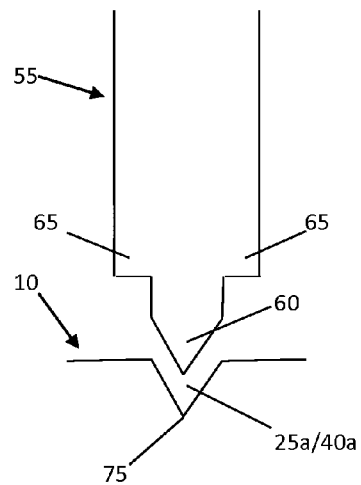
FIG. 19 depicts a cross-sectional front view of one embodiment of a complimentary cutting edge of a roller tool and a groove of a pan of the present invention.
Figure 20:
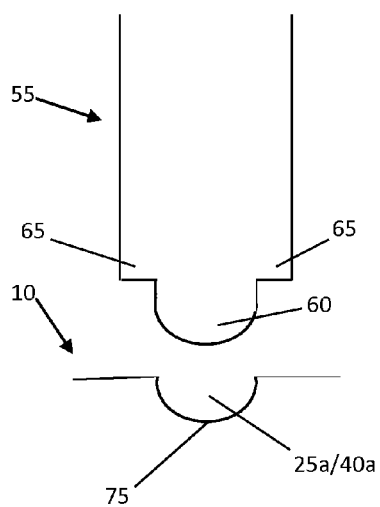
FIG. 20 depicts a cross-sectional front view of another embodiment of a complimentary cutting edge of a roller tool and a groove of a pan of the present invention.
Figure 21:
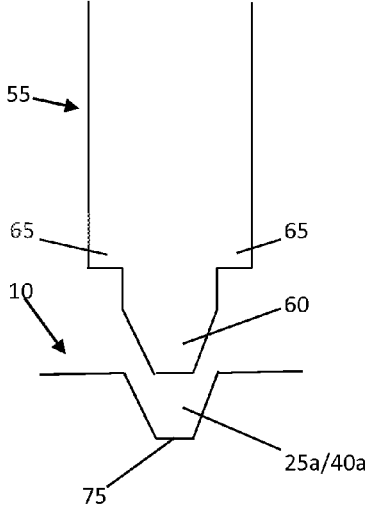
FIG. 21 depicts a cross-sectional front view of still another embodiment of a complimentary cutting edge of a roller tool and a groove of a pan of the present invention.
Figure 22:
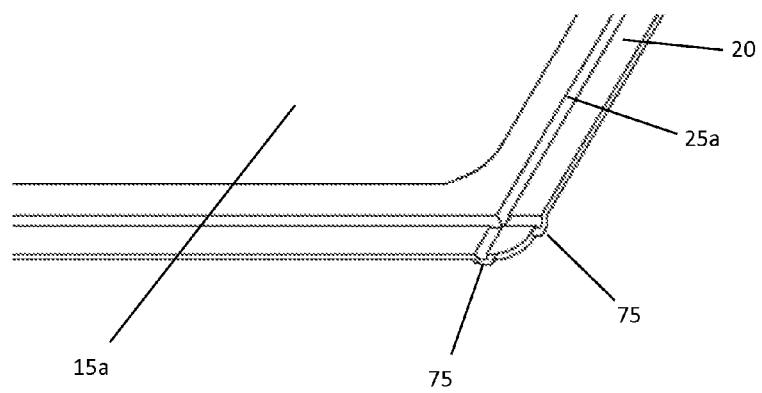
FIG. 22 depicts a magnified perspective view of single pocketed pan embodiment of a food preparation system of the present invention.
Figure 23:
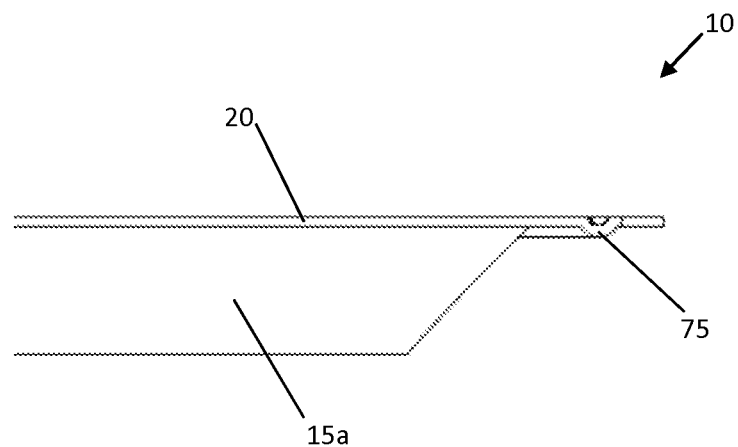
FIG. 23 depicts a magnified side view of single pocketed semicircular pan embodiment of a food preparation system of the present invention.

The cutting disk 55 of the roller tool 50 may comprise a central cutting edge 60 and a plurality of flutes 65 disposed parallel to and on both sides of the cutting edge 60. The radius of the cutting disk 55 at its cutting edge 60 may be greater that the radius of the cutting disk 55 at the plurality of flutes 65 thereby allowing the cutting edge 60 to cut through dough while the plurality of flutes 65 simultaneously compresses, seals, and flutes the dough on both sides of the cutting edge 60. In a preferred embodiment, the cutting edge 60 may be a rounded or radial edge providing a safe roller tool 50 that still effectively cuts dough but lacks a sharp, knife-like edge that could potentially injure a user. In other preferred embodiments and as shown in FIGS. 19-21, when a roller tool 50 is used in conjunction with a pan 10 of the present invention, the cutting edge 60 of the roller tool 50 may be complimentarily shaped to fit within the at least one perimeter track 25 and/or at least one dividing track 40. In FIGS. 19-21 the radius at the cutting edge 60 of the cutting disk 55 is shown to be greater than the radius of the cutting disk 55 at the pluralities of flutes 65. As examples of complimentary shapes, if a pan 10 comprises at least one perimeter track 25 and/or at least one dividing track 40 that comprises a groove 25a/40a having a V-shaped (see FIG. 19), a semi-circular (see FIG. 20), or a beveled (see FIG. 21) cross section, the cutting edge 60 of the complimentary roller tool 50 may also have a V-shaped, semi-circular, or beveled cross section allowing the cutting edge 60 to conform to and fit within the groove 25a/40a. When a cutting edge 60 is pressed into a complimentary shaped at least one perimeter track 25 and/or at least one dividing track 40, any dough there between is squeezed out of the respective track 25/40 without the need for a sharp cutting edge. The scope of the present invention includes any complimentary shaped cutting edges 60 and groove 25a/40a, with the V-shaped, semi-circular, and beveled embodiments being depicted as non-limiting examples only.

The plurality of flutes 65 on the roller tool 50 of the present invention may be constructed in any shape or configuration known within the art. FIG. 17 depicts an embodiment of a roller tool 50 having straight flutes 65a provided in half-cylindrical configurations, wherein the flutes 65 are disposed perpendicular to the cutting edge 60 of the cutting disk 55. FIG. 18 depicts an embodiment of a roller tool 50 having angled flutes 65b provided in half-cylindrical configurations, wherein the flutes 65b are disposed oblique to the cutting edge 60 of the cutting disk 55. Flutes of any shape or configuration are within the scope the present invention and FIGS. 17-18 are merely exemplary embodiments to more easily facilitate the disclosure of the invention and are not limiting or otherwise restrictive in scope. Each individual flute of the plurality of flutes 65 may comprise any shape configuration known within the art including but not limited to half spheres, cylinders, ellipses, ovals, cones, frustums, pyramids, prisms, other polygons, and the like.

While a pan 10 of the present invention may be used alone to simplify and increase the rate of preparation of filled food items as compared to systems and methods of the prior art, use of a pan 10 and a roller tool 50 of the present invention in combination is yet even more effective and beneficial to a user. Use of a roller tool 50 of the present invention allows a user to both simultaneously cut and flute (i.e. decorate) the dough of the stuffed food item(s) along both sides of the cutting edge 60.

In pan 10 embodiments having grooves 25a/40a and/or a plurality of flutes 25b/40b, the grooves or flutes may be stamped, molded, or otherwise formed on or within the pan 10 by any method known within the art. In use, the grooves 25a/40a and/or plurality of flutes 25b/40b on or within the pan 10 may provide structures that are capable of being felt by users on the underside of the pan 10 as they grasp the pan 10 and prepare to cut the layers of dough. Since the dough layers will hide the grooves 25a/40a and/or plurality of flutes 25b/40b forming the tracks 25/40 on the upper surface of the pan 10, the one or more tactile indicators 75 on the underside of the pan 10 may be greatly beneficial in allowing a user to quickly and easily find where to begin cutting the dough layers with either a conventional dough cutting tool T or a roller tool 50. As an example and as shown in FIGS. 19-23, when grooves 25a/40a are stamped or otherwise formed in the upper surface of the pan 10, such stamping may result in reciprocal ridges being formed and extending from the underside of the pan 10. In other embodiments, such one or more tactile indicators 75 may be added to the underside of the pan 10 if the groove 25a/40a and/or plurality of flutes 25b/40b formation processes do not inherently provide or produce any helpful tactile indicators 75.

The scope of the present invention also includes the method steps of preparing one or more stuffed food items using the pan 10 and/or roller tool 50 disclosed herein. FIGS. 24-27 depict the use of a pan 10 of the present invention in conjunction with a conventional dough cutting tool T. The scope of the present invention includes both the use of pans 10 having only one formed pocket (see FIGS. 1-8) as well as pans 10 having two or more pockets (see FIGS. 9-16). The examples discussed below will incorporate pans 10 having two or more pockets 15a, but the principles and method steps may readily be applied to pan 10 embodiments having only one pocket and at least one perimeter track 25.

Figure 24:
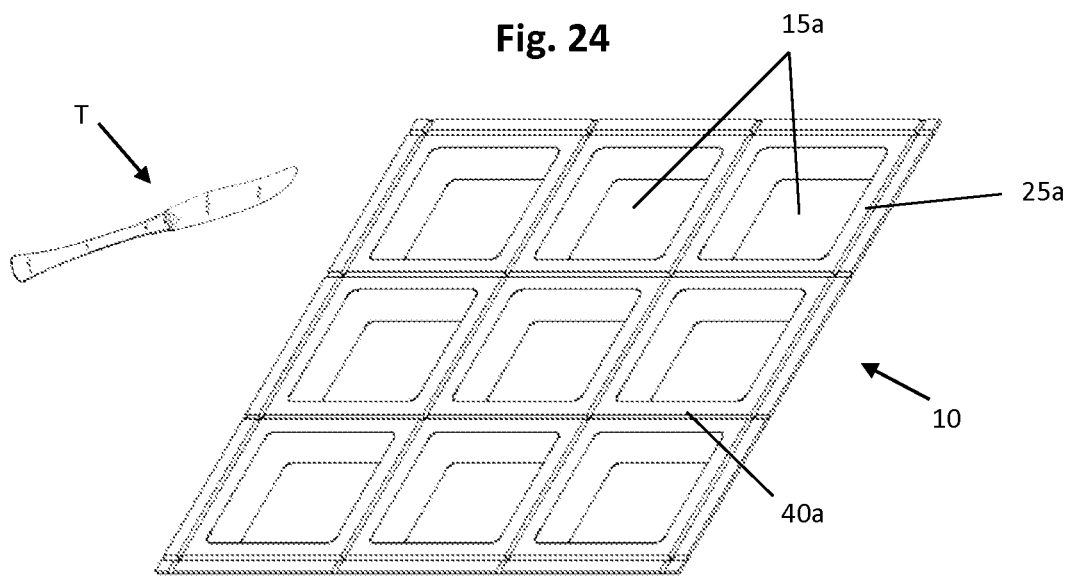
FIG. 24 depicts a perspective view of a conventional dough cutting tool and an embodiment of a food preparation pan of the present invention ready for use.
Figure 25:
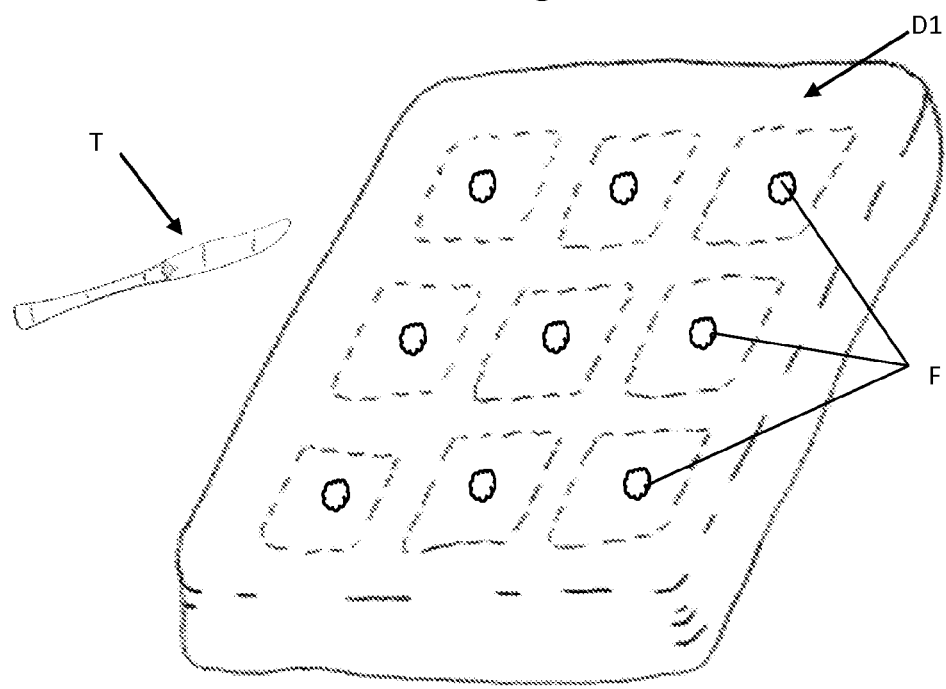
FIG. 25 depicts a perspective view of a conventional dough cutting tool and an embodiment of a food preparation pan of the present invention in use.
Figure 26:
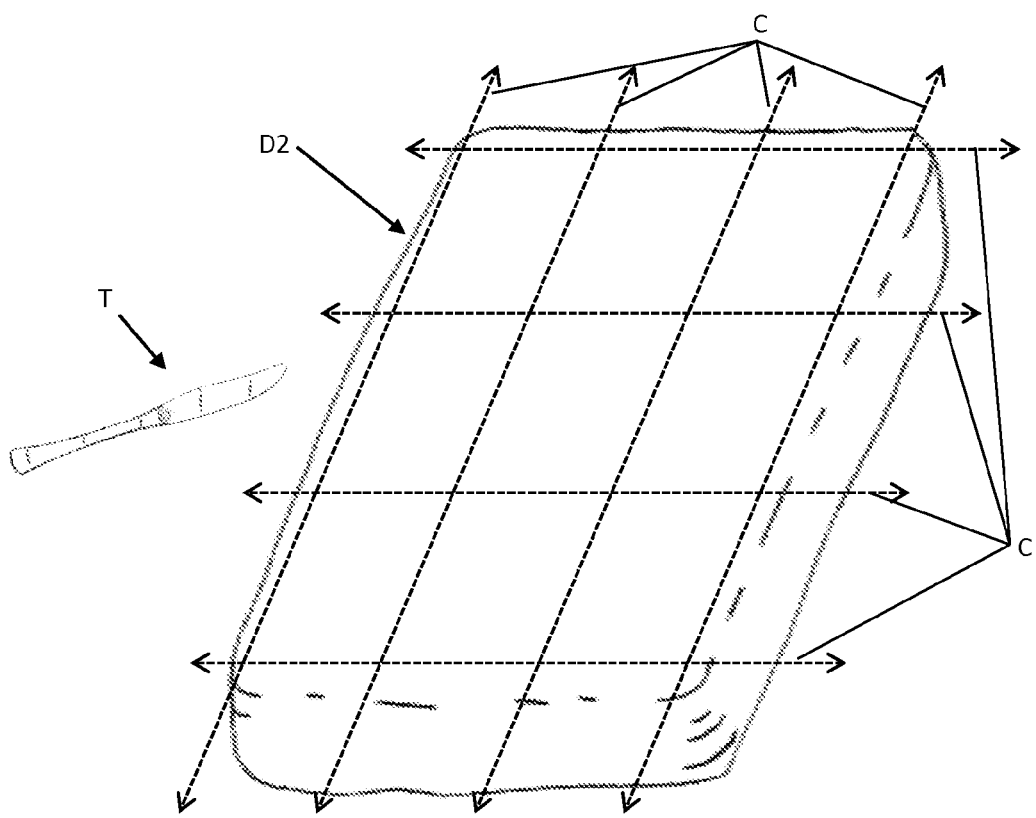
FIG. 26 depicts a perspective view of a conventional dough cutting tool and an embodiment of a food preparation pan of the present invention still further in use.
Figure 27:
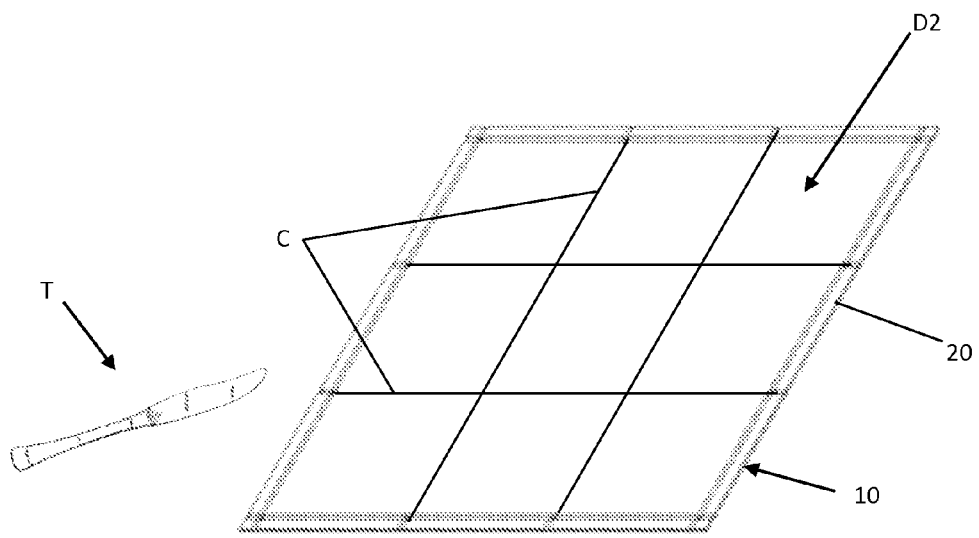
FIG. 27 depicts a perspective view of a conventional dough cutting tool and an embodiment of a food preparation pan of the present invention yet still further in use.
Figure 28:
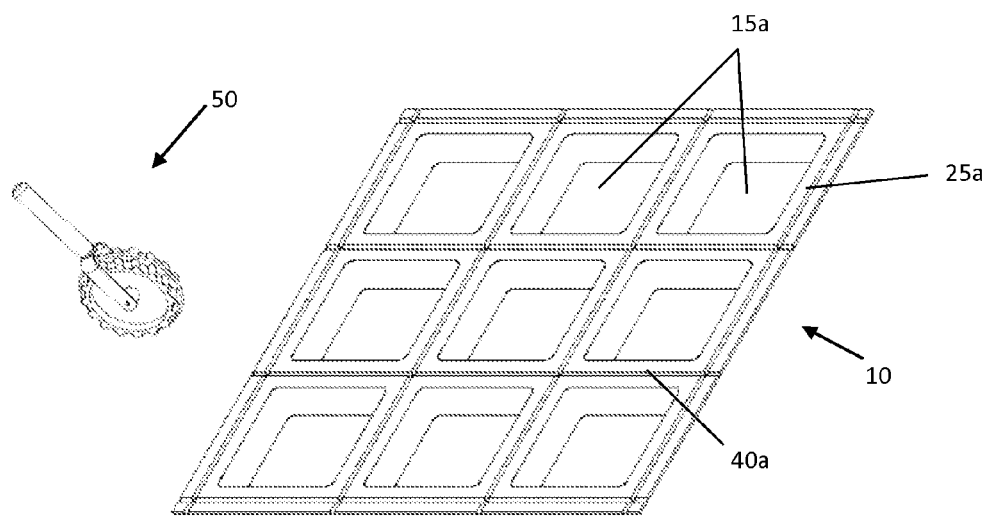
FIG. 28 depicts a perspective view of an embodiment of a roller tool and food preparation pan of the present invention ready for use.

In use alone and as shown in FIG. 24, a pan 10 of the present invention may be provided having two or more pockets 15a, wherein adjacent pockets are separated by one or more dividing ribs 35. The rim 20 of the pan 10 may comprise at least one perimeter track 25 in the form of a groove 25a on the upper surface of the rim 20, and the one or more dividing ribs 35 may further comprise at least one dividing track 40 in the form of a groove 40a on the upper surface of each rib. Any conventional dough cutting tool T may also be provided and used in conjunction with the pan 10. FIG. 25 depicts the pan and conventional dough cutting tool with a first layer of dough D1 being spread over and pressed into the two or more pockets 15a. One or more fillings F may then be placed within each of the two or more pockets 15 atop the first layer of dough D1. A second layer of dough D2 may then be placed over both the one or more fillings F and the first layer of dough D1 to provide a dough enclosure about the one or more fillings F. The user may then press the cutting edge of any conventional dough cutting tool T into the respective grooves 25a/40a that comprise the at least one perimeter track 25 and at least one dividing track 40 between the two or more pockets 15a. As shown in FIG. 26, the respective grooves 25a/40a may receive and guide the cutting edge of the conventional dough cutting tool T as the tool T is translated across the upper surface of the pan 10 by the user (see cut lines C). As shown in FIG. 27, the excess dough from both the first D1 and second D2 layers may be removed from about the outside of the pan 10 now that the excess dough has been cut from the respective filled food items by the cut lines C that extend through the dough layers. The edges of each of the filled food items may now be sealed, crimped, and/or fluted in any manner known within the art to provide an aesthetic appearance while helping seal the one or more fillings F within the first D2 and second D2 layers of dough so that the filled food items may be baked without leakage. Finally, the stuffed food items may either be baked while still in the pan 10 or the stuffed food items may be separated and removed from the pan 10 and baked on a conventional baking sheet or pan as desired. Pan 10 material and/or track configuration may influence which of the final baking steps is most appropriate. Plastic pans 10 and/or pans 10 having a plurality of flutes 25b/40b may be more appropriate for having the filled food items removed from the pan 10 and transferred to a baking sheet, while metal pans 10 and/or pans 10 having grooves 25a/40a may be most appropriate for allow the filled food items to be baked while still in the pan 10 of the present invention.

When a pan 10 having a plurality of flutes 25b/40b about the rim 20 and/or on the one or more dividing ribs 35 is used in the above method, pressure may be applied to the first layer of dough D1 causing the lower surface of the first layer of dough D1 to conform to the pattern provided by the plurality of flutes 25b/40b there below. In this manner, a decorative pattern may be provided onto the lower surface of the first layer of dough D1.

FIGS. 28-31 depict the use of a pan 10 of the present invention in conjunction with a roller tool 50. The process steps are the same as those described above until the user reaches the step of cutting the first D1 and second D2 dough layers with the roller tool 50 as opposed to using a conventional dough cutting tool T.

Figure 29:
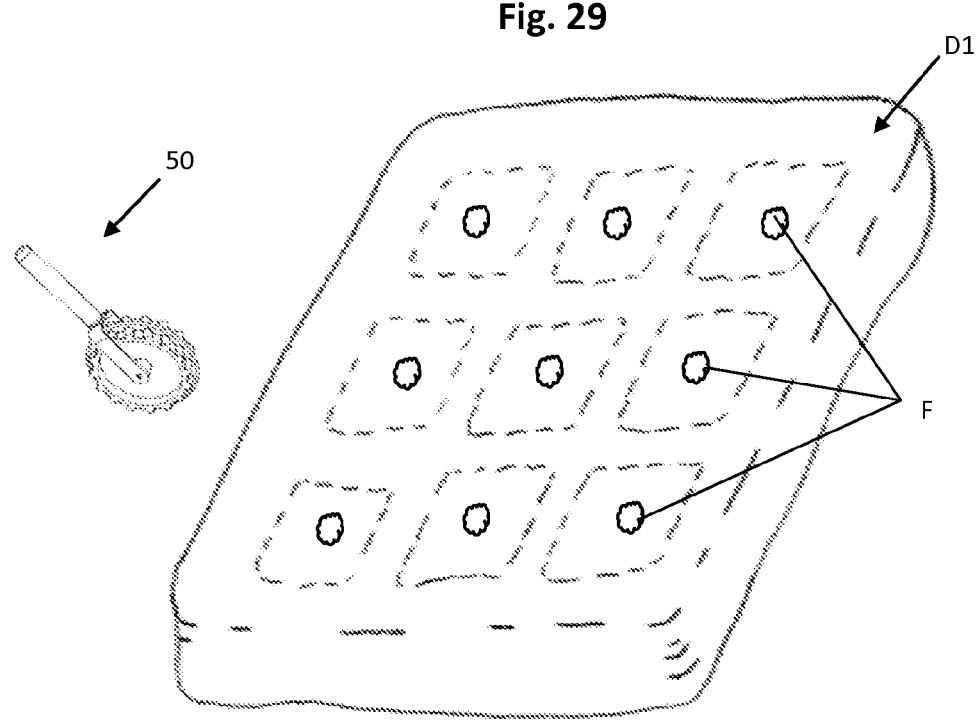
FIG. 29 depicts a perspective view of an embodiment of a roller tool and food preparation pan of the present invention in use.
Figure 30:
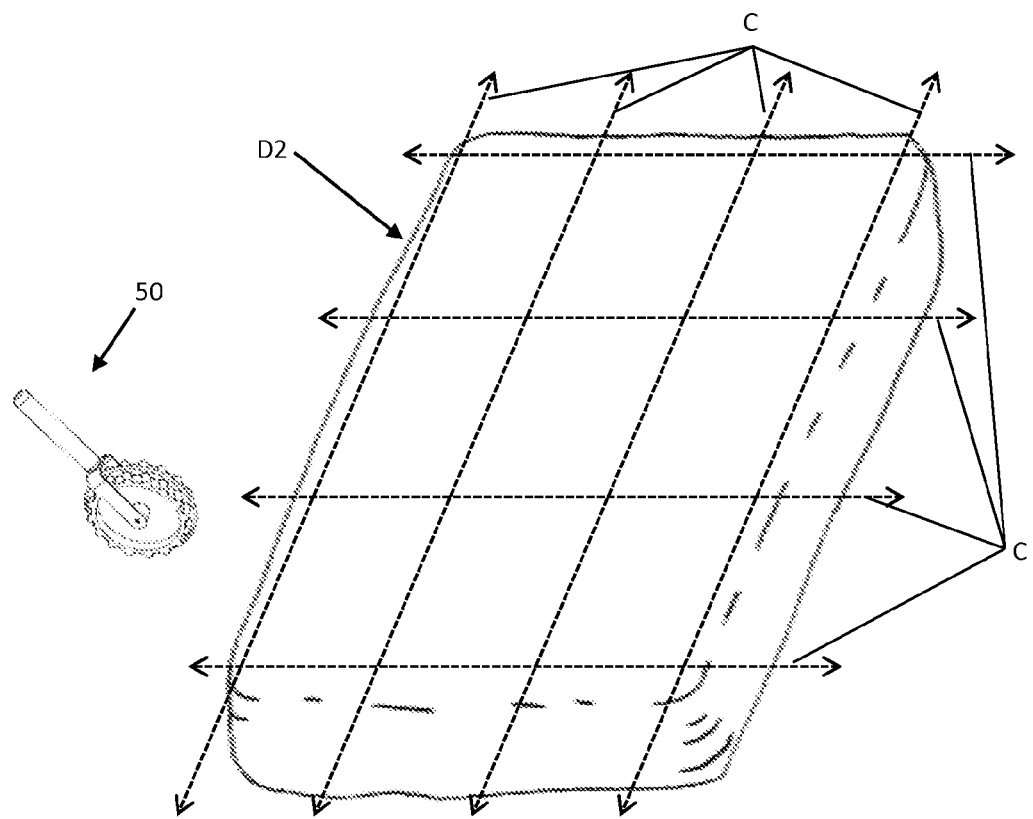
FIG. 30 depicts a perspective view of an embodiment of a roller tool and food preparation pan of the present invention still further in use.
Figure 31:
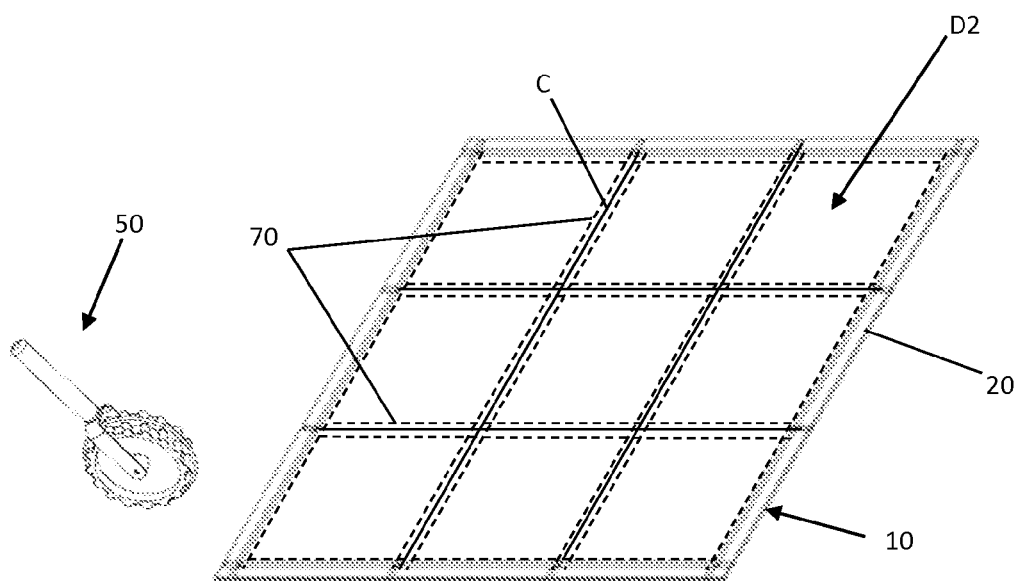
FIG. 31 depicts a perspective view of an embodiment of a roller tool and food preparation pan of the present invention yet still further in use.

In use and as also described in the method steps above (see FIG. 28), a pan 10 of the present invention may be provided having two or more pockets 15a, wherein adjacent pockets are separated by at one or more dividing ribs 35. As shown in FIG. 29, the pan 10 may then have a first layer of dough D1 spread over and pressed into the two or more pockets 15a with one or more fillings F then being placed within each of the two or more pockets 15a atop the first layer of dough D1. A second layer of dough D2 may then be placed over both the one or more fillings F and the first layer of dough D1 to provide a dough enclosure about the one or more fillings F. The user may then press the cutting edge 60 of the cutting disk 55 of the roller tool 50 into the respective grooves 25a/40a that comprise the at least one perimeter track 25 and at least one dividing track 40 between the two or more pockets 15a (see FIGS. 19-21). As shown in FIG. 30, the respective grooves 25a/40a may receive and guide the cutting edge 60 of the roller tool 50 as the roller tool 50 is translated or rolled across the upper surface of the pan 10 by the user (see cut lines L). As shown in FIG. 31, the excess dough from both the first D1 and second D2 dough layers may then be removed from about the outside of the pan 10 now that the excess dough has been cut from the respective filled food items about the cut lines C that extend through the dough layers. As also shown in FIG. 31, as the cutting edge 60 of the roller tool 50 is pressed into and guided along by the grooves 25a/40a, the plurality of flutes 65 disposed on the cutting disk 55 on both sides of the cutting edge 60 may be compressed into the two dough layers forming a seal there between while simultaneously forming decorative flute markings 70 within the first layer of dough D1 that conform to the shape of the plurality of flutes 65. The edges of each of the filled food items are now sealed, crimped, and/or fluted to provide an aesthetic appearance while helping seal the one or more fillings F within the first D2 and second D2 layers of dough so that the filled food items may be baked without leakage. Finally, the filled food items may either be baked while still in the pan 10 or the filled food items may be separated and removed from the pan 10 and baked on a conventional baking sheet or pan as desired. Pan 10 material and/or track configuration may influence which of the final baking steps is most appropriate. Plastic pans 10 and/or pans 10 having a plurality of flutes 25b/40b may be more appropriate for having the filled food items removed from the pan 10 and transferred to a baking sheet, while metal pans 10 and/or pans 10 having grooves 25a/40a may be most appropriate to allow for the filled food items to be baked while still in the pan 10 of the present invention.

When a pan 10 embodiment having a plurality of flutes 25b/40b about its rim 20 and/or on the one or more dividing ribs 35 is used in the above method, the compressive force provided by the roller tool 50 in cutting the dough layers and creating decorative flute markings 70 within the upper surface of the second layer of dough D2 also may cause the first layer of dough D1 to be pressed and/or conform into the plurality of flutes 25b/40b on the upper surface of the pan 10. In this manner, the combination of using a fluted pan 10 and a fluted roller tool 50 of the present invention allows a user to simultaneously cut a plurality of filled food items from one another while providing decorative flute markings 70 on both the upper and lower crust surfaces of each individual filled food item.

Figure 32:
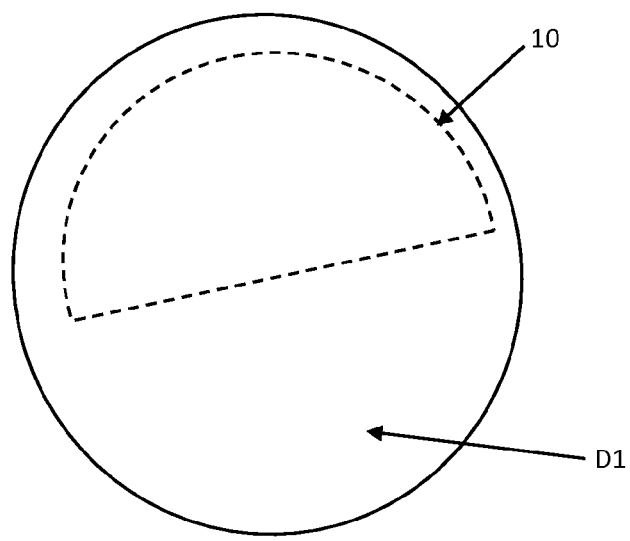
FIG. 32 depicts a top view of an embodiment of a food preparation pan of the present invention in use with dough.
Figure 33:
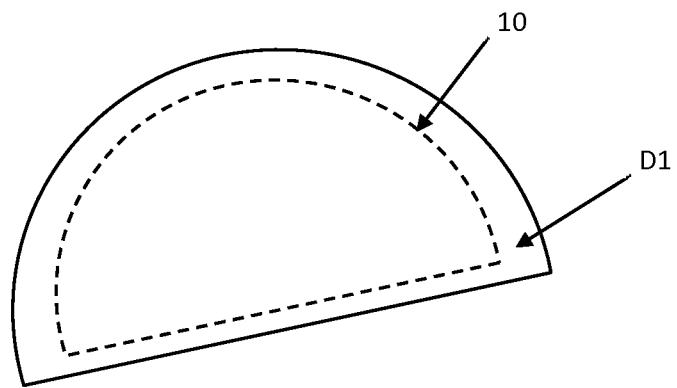
FIG. 33 depicts a top view of an embodiment of the food preparation pan of the present invention of FIG. 32 still in use.
Figure 34:
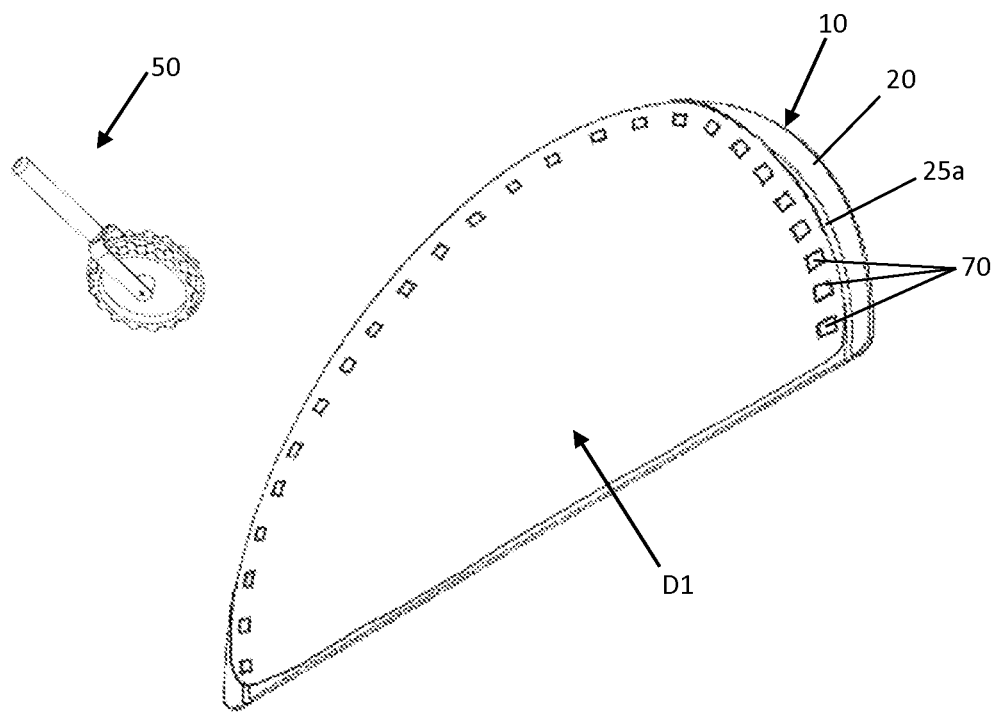
FIG. 34 depicts a perspective view of an embodiment of a roller tool in use in conjunction with the food preparation pan of FIG. 33.

Additional methods may be employed with any of the pan 10 embodiments of the present invention. A preferred embodiment may employ a half-shaped pan such as the semicircular and/or semi-hexagonal pans 10 depicted in FIGS. 4, 8, 12, and 16. As depicted in FIG. 32, a first layer of dough D1 may be provided that is equal to or greater than twice the surface area of the pan 10. The first layer of dough D1 may be laid over the upper surface of the pan 10 and the first layer of dough D1 may be pressed into the at least one pocket of the pan 10 so that the dough confirms to the pocket. As disclosed in the embodiments above, one or more fillings may be placed into the at least one packet on top of the first layer of dough D1. The present method now departs from the teachings of the above methods in that the portion of the first layer of dough D1 that is not overlaying the pan 10 may now be folded at or near the edge of the pan 10 thereby allowing the newly folded portion of dough to overlay the pan 10, the initial layer of dough in the pan 10, and the one or more fillings within the pocket of the pan 10 as shown in FIG. 33. A conventional dough cutting tool T or a roller tool 50 of the present invention may then be pressed into and guided within the at least one perimeter track 25 and/or the at least one dividing track 40 about the upper surface of the pan to cut the two layers of dough. As shown in FIG. 34 if a roller tool 50 is used (along with the pan 10 of FIG. 4), the cutting edge 60 will follow groove 25a about the rim 20 of the pan 10 while simultaneously fluting the upper surface of the dough on both sides of the cutting edge 60 of the roller tool 50. At least one perimeter track 25 may or may not be incorporated into the dough fold edge of the pan 10. Even if at least one perimeter track 25 is along the dough fold edge of the pan 10, the user may opt to not use the roller tool 50 along that edge especially if there is only one pocket and/or if at least one folded, non-fluted edge is desired. As disclosed above, a pan 10 having a plurality of flutes 25b (e.g. FIGS. 8 and 16) may be used along with a roller tool 50 to quickly provide filled food items having decorative flute markings 70 on both the upper and lower surfaces of the crust edge.

The systems and methods of the present invention provide for numerous improvements over the food preparation devices, systems, and methods found within the prior art. The at least one perimeter track 25 and/or at least one dividing track 40 on the upper surface of each pan 10 provide users with a fast and easy way to make filled food items such as pies, calzones, tarts, and the like as no special baking or dough making or handling skills are required. The specialized pans 10 of the present invention allow for near limitless variety of pan 10 styles (and thus filled food item), number of pockets, depth of pockets, and the like. The process is simplified for such users as the roller tool 50 is guided within the at least one perimeter track 25 and/or at least one dividing track 40 and such tracks may easily be found along the underside of the pan 10 by locating tactile indicators 75 such as a ridge and the like that may be disposed on the underside of the pan 10. The roller tool 50 of the present invention may both cut dough about the outer perimeter and between adjacent filled food items while simultaneously sealing, crimping, and/or fluting the cut edges of each filled food item. Preferred embodiments of the roller tool 50 provide a non-sharp cutting edge 60 such as a radial edge thereby making the system and methods of the present invention safe and user/child friendly. With the use of pre-made dough layers, users no longer have to contend with messy flour, dirty dishes and countertops, and the other pitfalls usually associated with making dough. Finally, clean-up has never been easier since the roller tool 50 may be constructed to have no places to trap dough and may be easily washed or put in a dishwasher along with the specialized pans 10 of the present invention.

The present invention is not to be taken as limited to all of the details thereof as modifications and variations thereof may be made without departing from the spirit or scope of the invention. For example, the present invention is neither limited by the specific shape of the pan, nor is it limited by the specific shape of the flutes.

What is claimed is:

1. A food preparation system, comprising:
 a pan comprising:
 a plurality of formed pockets;
 a flat rim disposed about the perimeter of the pan;
 a perimeter track disposed on the perimeter of each of the plurality of formed pockets so as to separate each of the plurality of formed pockets and to also extend along the entire length of the perimeter of the pan, wherein the perimeter track is defined by a recess formed in a surface of the pan; and
 a tactile indicator on a lower surface of the an defined as a lower portion of the recess of the perimeter track;
 wherein the perimeter track comprises a groove formed in an upper surface of the flat rim;
 wherein portions of the perimeter track of each of the plurality of formed pockets extend to an edge of the pan;
 wherein the perimeter track of the plurality of formed pockets that are adjacent to one another meet to form a continuous perimeter track that extends from one end of the pan to another end of the pan;
 wherein the tactile indicator forms a projection along the underside of the lower surface;

wherein the tactile indicator is configured to provide tactile information relating to the location of the perimeter track;

wherein each of the plurality of formed pockets is defined by a bottom, sidewalls that extend upwardly from the bottom and a top;

wherein outer edges of the top are defined by the perimeter track on each of the plurality of formed pockets; and a roller tool comprising;

a cutting disk having a cutting edge about the circumference thereof; and a plurality of flutes disposed about the circumference of the cutting disk;

wherein the plurality of flutes are disposed adjacent to and on both sides of the cutting edge;

wherein the radius of the cutting disk at the cutting edge is greater than the radius of the cutting disk at each of the plurality of flutes;

wherein the cutting disk of the roller tool is adapted to engage the perimeter track of each of the plurality of formed pockets adjacent the edge of the pan; and wherein the cutting edge of the cutting disk is sized to matingly engage the groove of the perimeter track; and wherein the plurality of flutes on the circumference of the cutting disk are adapted to engage portions of the flat rim when the cutting edge matingly engages the groove of the perimeter track.

2. The food preparation system of claim 1, wherein the perimeter track comprises a channel defined by two parallel rows of a plurality of flutes formed on an upper surface of said rim.

3. The food preparation system of claim 1, wherein the pan further comprises multiple tactile indicators that are configured to provide tactile information relating to the location of the perimeter track.

4. The food preparation system of claim 1, wherein the cutting edge comprises a radial edge.

\* \* \* \* \*